(12) United States Patent
Kao

(10) Patent No.: US 7,030,943 B2
(45) Date of Patent: Apr. 18, 2006

(54) LIQUID CRYSTAL DISPLAY AND BACK LIGHT MODULE THEREOF

(75) Inventor: Hung Chen Kao, Taipei (TW)

(73) Assignee: Hannstar Display Corp., (TW)

( * ) Notice: Subject to any disclaimer, the term of this patent is extended or adjusted under 35 U.S.C. 154(b) by 1 day.

(21) Appl. No.: 10/704,737

(22) Filed: Nov. 12, 2003

(65) Prior Publication Data

US 2004/0207773 A1   Oct. 21, 2004

(30) Foreign Application Priority Data

Apr. 18, 2003   (TW) .............................. 92109316 A

(51) Int. Cl.
*G02F 1/1333*   (2006.01)
*G02F 1/1335*   (2006.01)

(52) U.S. Cl. .......................................... 349/58; 349/64
(58) Field of Classification Search ................. 349/58, 349/61–65
See application file for complete search history.

(56) References Cited

U.S. PATENT DOCUMENTS

| 6,407,781 B1 | 6/2002 | Kitada .......................... 345/102 |
| 6,417,833 B1 | 7/2002 | Takemoto ....................... 349/58 |
| 6,847,416 B1 * | 1/2005 | Lee et al. ........................ 349/58 |
| 2001/0050731 A1 * | 12/2001 | An et al. ........................ 349/58 |
| 2003/0189759 A1 * | 10/2003 | Kim et al. .................. 359/619 |

FOREIGN PATENT DOCUMENTS

JP   4-199125   * 7/1992

* cited by examiner

*Primary Examiner*—Dung T. Nguyen

(57) ABSTRACT

A liquid crystal display includes a liquid crystal panel, a housing, and an optical film. The liquid crystal panel is used for displaying images. The housing supports the liquid crystal panel and has a plurality of lamps and sliding grooves. The lamps are used for transmitting light to the liquid crystal panel. The optical film is disposed in the sliding grooves.

18 Claims, 3 Drawing Sheets

LIQUID CRYSTAL DISPLAY AND BACK LIGHT MODULE THEREOF

CROSS REFERENCE TO RELATED APPLICATION

This application claims the priority benefit of Taiwan patent application serial No. 092109316, filed on Apr. 18, 2003, and the full disclosure thereof is incorporated herein by reference.

BACKGROUND OF THE INVENTION

1. Field of the Invention

The present invention generally relates to a back light module of a liquid crystal display, and more particularly, to a back light module of a liquid crystal display (LCD) which is provided with a sliding groove for mounting the optical films therein.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light weight and non-luminescence display, liquid crystal displays (LCD) have been widely used in the electronic products and even have replaced the traditional CRT displays.

Referring to FIG. 1, it depicts a conventional liquid crystal display (LCD). In general, the liquid crystal display includes a liquid crystal panel 10 which has two substrates with liquid crystal material sealed therebetween, a back light module 20 of the direct type disposed under the liquid crystal display panel 10, and a case 11.

The back light module 20 of the direct type is utilized to distribute the light transmitted from a light source uniformly over the surface of the liquid crystal display panel 10. For the liquid crystal display in large dimensions, the back light module of the direct type is widely used because of its easy installation and its low cost.

The back light module 20 of the direct type includes a housing 70 which has a reflective sheet 60 disposed on the bottom surface of the housing 70, lamps 50, such as a fluorescence cathode tube, disposed at the bottom of the housing 70, a plurality of optical films 30, such as a diffuser sheet and a prism sheet, disposed on the upper surface of the housing 70, and a diffuser plate 32 disposed between the optical films 30 and the housing 70. The lamps 50 are spaced apart from each other and disposed within the display area of the liquid crystal panel 10. Since the light source, i.e. the lamps 50, is a linear light source, the lamps 50 cannot provide light evenly illuminating the liquid crystal panel 10. Therefore, the diffuser plate 32 and the optical films 30 such as a diffuser sheet and a prism sheet have to be disposed between the lamps 50 and the liquid crystal panel 10 to provide a panel light source device with uniform luminance.

Many back light modules have been disclosed in the prior art, such as those disclosed in U.S. Pat. No. 6,407,781 B2 issued to Kitada on Jun. 18, 2002 and in U.S. Pat. No. 6,417,833 B1 issued to Takemoto et al. on Jul. 9, 2002, which are all incorporated herein by reference.

The back light module 20 is normally provided with a front frame 40 disposed in front of the back light module 20. The front frame 40 is usually made of aluminum, stainless steel, or zinc-plated steel for fixing the optical films 30 and the diffuser plate 32 on the back light module 20, and the housing 70 is used for supporting the liquid crystal panel 10 and the back light module 20. For the liquid crystal display with large dimensions, especially for the liquid crystal display larger than 30 inches, the front frame 40 cannot be formed by a punching process and thus must be formed by a welding process, wherein the welding process is time-consuming and expensive.

Accordingly, there exists a need for a liquid crystal display having a direct type back light module without the metal frame.

SUMMARY OF THE INVENTION

It is an object of the present invention to provide a liquid crystal display having a direct type back light module with a sliding groove for fixing optical films.

In order to achieve the above object, the present invention provides a liquid crystal display comprising a liquid crystal panel, a housing, an optical film, and a diffuser plate. The liquid crystal panel is used for displaying images. The housing supports the liquid crystal panel and has a plurality of lamps and sliding grooves. The lamps are used for transmitting light to the liquid crystal panel. The optical film and the diffuser plate are disposed in the sliding groove.

According to the present invention, the housing of the back light module is used for fixing the optical film and the diffuser plate. Further, the optical films are secured in the sliding grooves by means of bolts and the liquid crystal display is usually upstanding during use, so the optical films are substantially hung on the bolts, rather than supported on the frame, thereby facilitating reducing the deformation of the optical films.

BRIEF DESCRIPTION OF THE DRAWINGS

Other objects, advantages, and novel features of the invention will become more apparent from the following detailed description when taken in conjunction with the accompanying drawing.

DESCRIPTION OF THE EMBODIMENT

Figure 1:
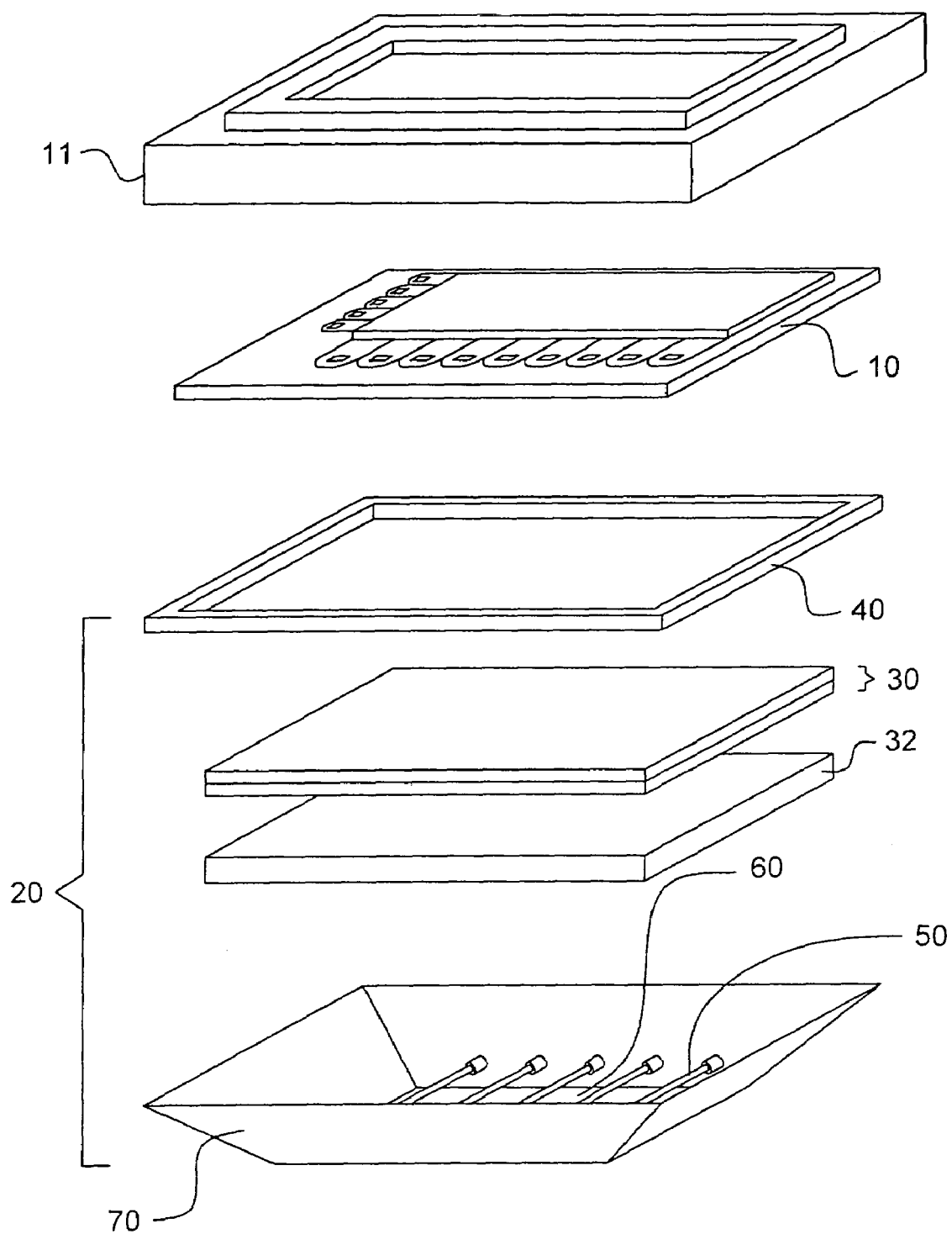
FIG. 1 is a perspective exploded schematic view of a liquid crystal display according to the prior art.
Figure 2:
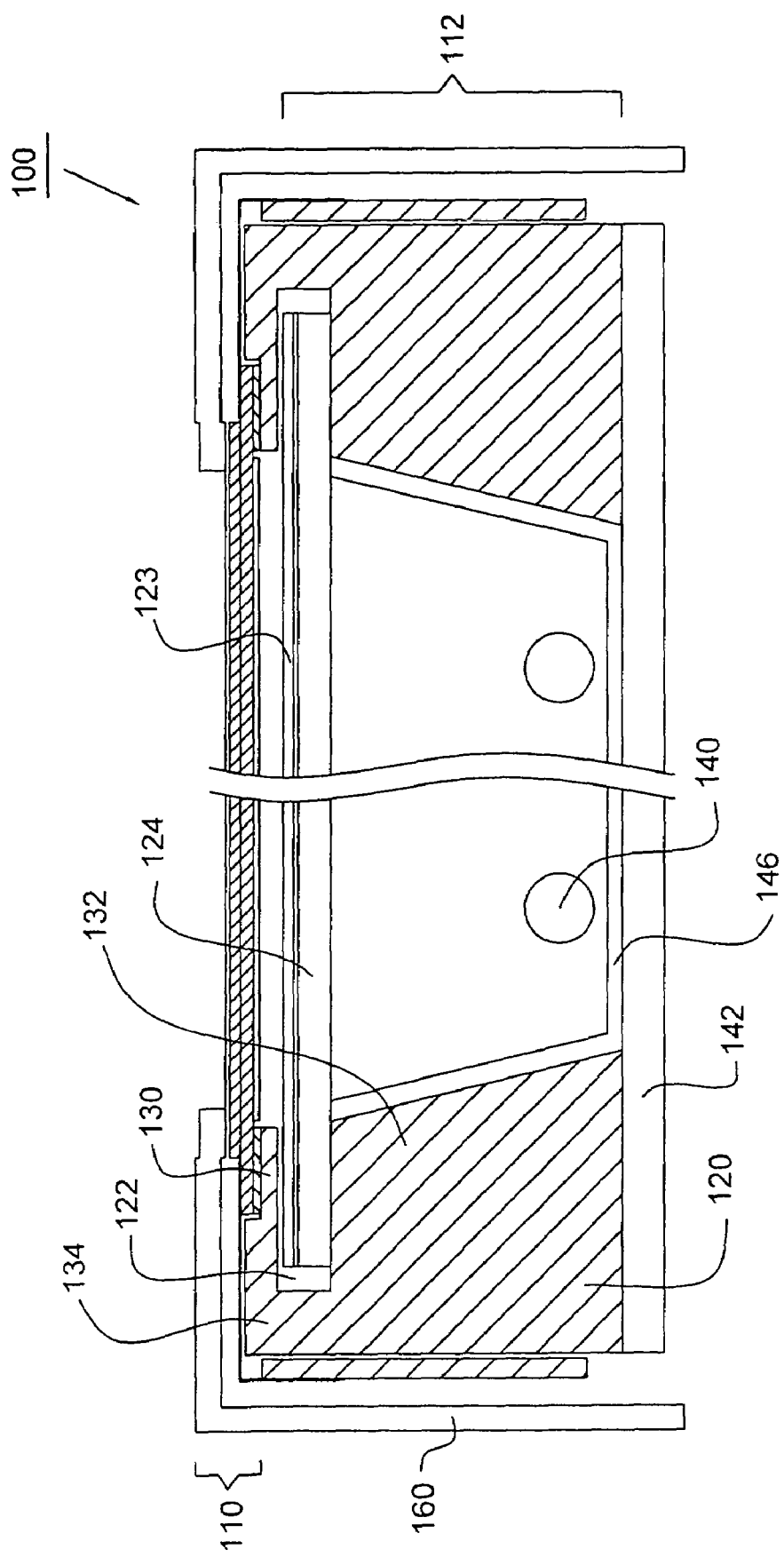
FIG. 2 is a schematic cross sectional view of a liquid crystal display according to an embodiment of the present invention.

Referring to FIG. 2, it depicts a liquid crystal display 100 according to an embodiment of the present invention. The liquid crystal display 100 comprises a liquid crystal panel 110 for displaying images, a back light module 112 for transmitting light to the liquid crystal panel 110, and a frame 160 for fixing the back light module 112 and the liquid crystal panel 110 together. The liquid crystal panel 110 includes two print circuit boards (PCBs), not shown, for transmitting the control signals and the driving signals to the liquid crystal panel 110.

Figure 3:
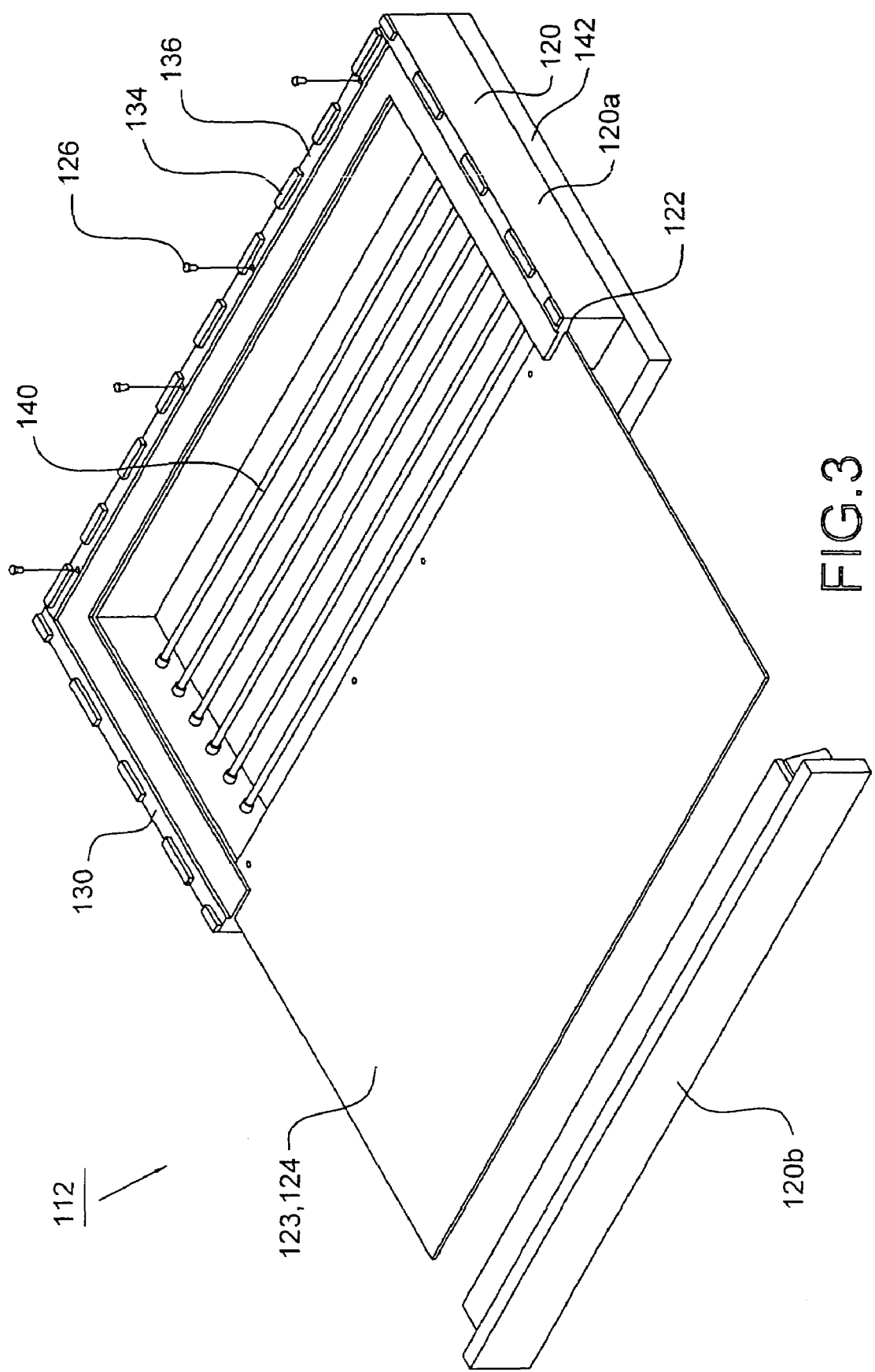
FIG. 3 is a schematic perspective exploded view of a frame and optical films of the liquid crystal display according to the embodiment of the present invention.

Referring to FIG. 3, it depicts the back light module 112 of the liquid crystal display 100. The back light module 112 includes a housing 120 which is substantially rectangular, and the housing 120 is corresponding to and abutting the liquid crystal panel 110. The housing 120 includes a body 132 and a protrusive portion 130 for defining a sliding groove 122. The body 132 has a predetermined thickness and a predetermined strength for supporting the liquid crystal panel 110 and the back light module 112. Furthermore, the sliding groove 122 is disposed inside the housing 120 for mounting a plurality of optical films 123 and a diffuser plate 124. It will be apparent to those skilled in the art that the optical films 123 can include varied optical films, such as a diffuser sheet and a prism sheet. The diffuser plate 124 and the optical films 123 are used for further evenly diffusing the light. For example, the prism sheet is commercially available from 3M™ Company of St. Paul Minn. under the trade name Brightness Enhancement Film series for gathering the light in the direction perpendicular thereto.

The housing 120 is provided with a back plate 142 for forming a cavity and receiving a plurality of lamps 140. A reflector 146 is disposed on the back plate 142 and inside the housing 120 for reflecting the light transmitted from the lamps 140.

The housing 120 further includes a plurality of projections 134 extending upward from the body 132. When the liquid crystal panel 110 is attached to the back light module 112, the protrusive portion 130 supports the liquid crystal panel 110 and the projections 134 abut against the liquid crystal panel 110, thereby keeping the liquid crystal panel 110 in place.

The body 132, the protrusive portion 130, and the projections 134 of the housing 120 can be integrally molded of plastic material. Alternatively, the body 132, the protrusive portion 130, and the projections 134 of the housing 120 can be molded respectively, and then be assembled together, for example, by using adhesive.

Referring to FIG. 3, there are a plurality of notches 136 disposed between the projections 134 for receiving the tape carrier packages (TCPs), not shown, which are connected to the liquid crystal panel 110. In the manufacturing process for the back light module 112, the lamps 140 are attached on the back plate 142. Then, the housing 120 has an U-shape element 120a disposed on the back plate 142, and a detachable side element 120b. Then, the optical films 123 and the diffuser plate 124 are inserted into the sliding grooves 122 and are slid in place. A plurality of bolts 126 pass through the protrusive portion 130 for securing the optical films 123 and the diffuser plate 124. Then the detachable side element 120b is attached to the back plate 142 and the U-shape element 120a by means of bolts or adhesive so as to form the housing 120 and fix the optical films 123 and the diffuser plate 124 in the sliding grooves 122.

As mentioned above, the body of the back light module of the liquid crystal display according to the present invention has predetermined thickness and predetermined strength, and thus the metal frame is not required to support the back light module. Furthermore, the optical films are fixed or attached in the sliding groove by means of bolts and the liquid crystal display is usually upstanding during use, so the optical films are substantially hung on the bolts, rather than supported on the frame, thereby facilitating reducing the deformation of the optical films.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A liquid crystal display, comprising:
    a liquid crystal panel for displaying images;
    a housing supporting the liquid crystal panel, wherein the housing has a sliding groove and one side of the housing is detachable; and
    at least one optical film disposed in the sliding groove; wherein
    said housing comprises a U shaped wall section defining three sides of said housing and a straight wall section defining the detachable side of said housing;
    said U shaped wall section includes therein said sliding groove which is also U shaped; and
    said straight wall section is attached to said U shaped wall section to close said sliding groove and define a box shape of said housing.

2. The liquid crystal display as claimed in claim 1, further comprising:
    a plurality of bolts for securing the optical film in the sliding groove.

3. The liquid crystal display as claimed in claim 1, fiber comprising:
    a plurality of projections disposed on the housing for positioning the liquid crystal panel in place.

4. The liquid crystal display as claimed in claim 3, further comprising:
    a plurality of notches disposed between the projections.

5. The liquid crystal display as claimed in claim 1, further comprising
    a back plate disposed under the housing.

6. The liquid crystal display as claimed in claim 5, further comprising:
    a reflector disposed on the inside of the back plate.

7. The liquid crystal display as claimed in claim 1, further comprising:
    a plurality of lamps disposed in the housing for transmitting light to the liquid crystal panel.

8. The liquid crystal display as claimed in claim 1, wherein said sliding groove is U-shaped.

9. The liquid crystal display as claimed in claim 1, wherein said liquid crystal panel is located outside said housing and being supported from below by said housing which contains therein at least a lamp for generating light to be transmitted to said liquid crystal panel.

10. The liquid crystal display as claimed in claim 9, wherein said housing is closed at an upper side thereof by said optical film and at a lower side thereof by a back plate which supports a reflector below said lamp.

11. The liquid crystal display as claimed in claim 10, wherein said U shaped wall section comprising on a top surface thereof a plurality of spaced projections, said liquid crystal panel being placed on and supported by said projections.

12. The liquid crystal display as claimed in claim 11, further comprising a plurality of tap carrier packages electrically connected to said liquid crystal panel and extending between adjacent ones of said projections.

13. A back light module for a liquid crystal display comprising:
    a housing being substantially rectangular in shape, wherein the housing consists of a U-shape element and a detachable side element;
    a protrusive portion disposed on the housing for defining a sliding groove; and
    at least one optical film disposed in the sliding groove; wherein
    said U-shape element is a U shaped wall section defining three sides of said housing and said detachable side element is a straight wall section defining a detachable side of said housing;
    said U shaped wall section includes therein said sliding groove which is also U shaped; and said straight wall section is attached to said U shaped wall section to close said sliding groove and define the substantially rectangular shape of said housing.

14. The back light module as claimed in claim 13, further comprising:

a plurality of bolts for securing the optical film in the sliding groove.

15. The back light module as claimed in claim 13, wherein the liquid crystal display has a liquid crystal panel and the back light module farther comprises a plurality of projections disposed on the protrusive portion of the housing for positioning the liquid crystal panel in place and a plurality of notches disposed between the projections.

16. The back light module as claimed in claim 13, further comprising:

a back plate disposed under the housing.

17. The back light module as claimed in claim 16, further comprising:

a reflector disposed on the inside of the back plate.

18. The back light module as claimed in claim 13, further comprising:

a plurality of lamps disposed in the housing.

* * * * *